(12) United States Patent
Sumioka

(10) Patent No.: US 9,823,630 B2
(45) Date of Patent: Nov. 21, 2017

(54) CONTROL DEVICE, ACTUATOR INCLUDING CONTROL DEVICE, IMAGE BLUR CORRECTION DEVICE, REPLACEMENT LENS, IMAGING DEVICE AND AUTOMATIC STAGE

(71) Applicant: CANON KABUSHIKI KAISHA, Tokyo (JP)

(72) Inventor: Jun Sumioka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 497 days.

(21) Appl. No.: 14/017,269

(22) Filed: Sep. 3, 2013

(65) Prior Publication Data

US 2014/0074297 A1    Mar. 13, 2014

(30) Foreign Application Priority Data

Sep. 10, 2012 (JP) .................................. 2012-198614
Aug. 28, 2013 (JP) .................................. 2013-176525

(51) Int. Cl.
  G05B 15/02   (2006.01)
  H02N 2/00    (2006.01)
  G02B 21/26   (2006.01)
  H02N 2/02    (2006.01)

(52) U.S. Cl.
  CPC ............ *G05B 15/02* (2013.01); *G02B 21/26* (2013.01); *H02N 2/0075* (2013.01); *H02N 2/0095* (2013.01); *H02N 2/0015* (2013.01); *H02N 2/028* (2013.01)

(58) Field of Classification Search
  CPC ..................................................... G05B 15/02
  See application file for complete search history.

(56) References Cited

U.S. PATENT DOCUMENTS

| 5,812,420 | A |   | 9/1998  | Takahashi |
| 5,870,634 | A | * | 2/1999  | Sugaya ................... G03B 5/00 396/52 |
| 5,883,702 | A | * | 3/1999  | Tokunaga ........... G03F 7/70216 318/575 |
| 5,982,128 | A | * | 11/1999 | Lee ..................... G03F 7/70716 248/638 |
| 6,084,334 | A |   | 7/2000  | Yamamoto et al. |

(Continued)

FOREIGN PATENT DOCUMENTS

| CN | 1263339 A | 8/2000 |
| CN | 1577033 A | 2/2005 |

(Continued)

OTHER PUBLICATIONS

European Search Report dated Apr. 29, 2015 in European Application No. 13183478.0.

(Continued)

*Primary Examiner* — Jason Lin
(74) *Attorney, Agent, or Firm* — Fitzpatrick, Cella, Harper & Scinto

(57) ABSTRACT

Provided is a vibration type driving device enabling multi-directional driving of a moving body while considering a difference in transfer characteristics of the synthesized driving force of a plurality of motors between at least two mutually crossing directions.

34 Claims, 15 Drawing Sheets

(56) References Cited

U.S. PATENT DOCUMENTS

| | | | |
|---|---|---|---|
| 6,437,864 B1* | 8/2002 | Watanabe | G03F 7/70716 355/53 |
| 6,501,210 B1 | 12/2002 | Ueno | |
| 6,522,388 B1* | 2/2003 | Takahashi | F16F 15/02 248/550 |
| 6,791,098 B2* | 9/2004 | Pletner | F16F 15/005 250/548 |
| 7,085,484 B2 | 8/2006 | Hara | |
| 8,805,556 B2* | 8/2014 | Saiki | G03F 7/70775 355/72 |
| 2004/0013420 A1 | 1/2004 | Hara | |
| 2006/0153472 A1* | 7/2006 | Sakata | H04N 5/23248 382/255 |
| 2007/0071424 A1* | 3/2007 | Poon | H04N 5/23248 396/52 |
| 2008/0145042 A1* | 6/2008 | Kawai | G03B 5/00 396/55 |
| 2011/0304933 A1 | 12/2011 | Uchiyama | |

FOREIGN PATENT DOCUMENTS

| | | |
|---|---|---|
| JP | 2004-56878 | 2/2004 |
| JP | 2008-236820 A | 10/2008 |
| JP | 2009-225503 A | 10/2009 |
| JP | 2009225503 A * | 10/2009 |

OTHER PUBLICATIONS

Chinese Office Action dated Jun. 2, 2015 in corresponding Application No. 201310404731.8 (whole English Translation included).
Japanese Office Action issued Jun. 6, 2017 during prosecution of related Japanese application No. 2013-176525.

* cited by examiner

FIG. 6A $$\begin{cases} M1 = \cos(45\deg) \left\{ \begin{bmatrix} -\Delta X \\ 0 \end{bmatrix} + \begin{bmatrix} 0 \\ \Delta Y \end{bmatrix} + R\theta \begin{bmatrix} d3\text{-}x \\ d3\text{-}y \end{bmatrix} \right\} \\ M2 = \cos(45\deg) \left\{ \begin{bmatrix} -\Delta X \\ 0 \end{bmatrix} + \begin{bmatrix} 0 \\ -\Delta Y \end{bmatrix} + R\theta \begin{bmatrix} -d3\text{-}x \\ d3\text{-}y \end{bmatrix} \right\} \\ M3 = \cos(45\deg) \left\{ \begin{bmatrix} \Delta X \\ 0 \end{bmatrix} + \begin{bmatrix} 0 \\ -\Delta Y \end{bmatrix} + R\theta \begin{bmatrix} -d3\text{-}x \\ -d3\text{-}y \end{bmatrix} \right\} \\ M4 = \cos(45\deg) \left\{ \begin{bmatrix} \Delta X \\ 0 \end{bmatrix} + \begin{bmatrix} 0 \\ \Delta Y \end{bmatrix} + R\theta \begin{bmatrix} d3\text{-}x \\ -d3\text{-}y \end{bmatrix} \right\} \end{cases}$$

FIG. 6B $$R\theta = \begin{bmatrix} \cos(\Delta\theta)-1 & -\sin(\Delta\theta) \\ \sin(\Delta\theta) & \cos(\Delta\theta)-1 \end{bmatrix}$$

FIG. 6C

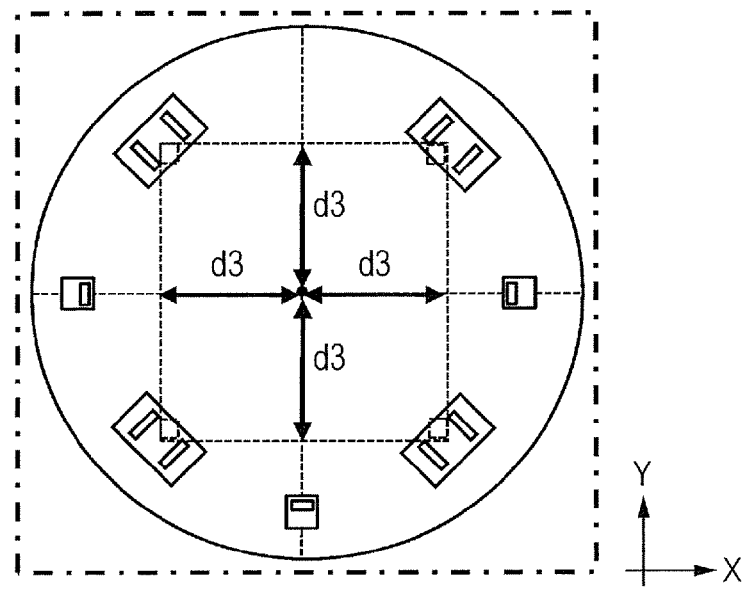

$$\begin{cases} x = X1 - (d1 \cdot \sin\theta) \\ y = (Y1+Y2)/2 \\ \theta = \arcsin\{(Y1-Y2)/(2 \cdot d1)\} \end{cases}$$

CONTROL DEVICE, ACTUATOR INCLUDING CONTROL DEVICE, IMAGE BLUR CORRECTION DEVICE, REPLACEMENT LENS, IMAGING DEVICE AND AUTOMATIC STAGE

BACKGROUND OF THE INVENTION

Field of the Invention

The present invention relates to a control device, an actuator including a control device, an image blur correction device, a replacement lens, an imaging device and an automatic stage. Specifically the present invention relates to a control device, an actuator including a control device, an image blur correction device, a replacement lens, an imaging device and an automatic stage capable of driving a moving body multidirectionally by synthesizing driving forces of a plurality of motors.

Description of the Related Art

Conventionally proposed actuators enabling multidirectional driving (hereinafter called, a multi-degree freedom driving device) include a device implementing XYθ driving using a linear actuator (Japanese Patent Application Laid-Open No. 2009-225503).

FIG. 10A shows the structure of a conventional multi-degree freedom driving device.

A base plate 1 is a base of this multi-degree freedom driving device, and vibrators 2, 3 and 4 drive a moving body 5. A position sensor 6 detects an X-direction position, and position sensors 7 and 8 detect a Y-direction position.

FIG. 10B is a side view of the device.

The vibrators 2 (not illustrated), 3 and 4 each include a vibration member (the upper part, of the vibrator 3, 4) having one protrusion and a piezoelectric element (shaded area), which are integrated by bonding or the like, and are attached to the base plate 1 via a not-illustrated attachment member.

Scale parts 6', 7' and 8' are provided at a face above the position sensors. For instance, as the scale part 6' moves in the X-direction, the sensor 6 outputs a positional signal corresponding to the movement amount.

The sensor 7 and the sensor 8 output positional signals corresponding to the movement amounts of the scale part 7' and the scale part 8' in the Y-direction, respectively.

This configuration moves the moving body in the direction that is a vector-synthesized direction of the driving forces of the vibrators 2, 3 and 4.

Japanese Patent application Laid-Open. No. 2009-225503 proposes a control system of a vibration type multi-degree freedom driving device shown in FIGS. 10A and 10B, and proposes a control method to correct variations of the individual vibration type motors. The control system includes a controller configured to perform PID control individually for a plurality of vibration type motors. That is, the conventional controller transforms position command values of XYθ into each motor movement amount, and then makes PID compensators individually provided perform position control.

FIG. 11 shows a control system of a conventional multi-degree freedom driving device.

The following describes the case of using the vibration type multi-degree freedom driving device shown in FIGS. 10A and 10B. A controller not illustrated gives position commands X, Y and θ, which are input to a motor coordinate transformation unit 1101.

The motor coordinate transformation unit 1101 deals with three vibration type motors (three vibrators) M1, M2 and M3, and includes a M1 coordinate transformation unit, a M2 coordinate transformation unit and a M3 coordinate transformation unit.

This unit transforms the position commands X, Y and θ into values on the coordinate positions where these vibration type motors are disposed, and the values depend on the directions of the position commands X, Y and θ and angles of vectors generating driving forces of the motors.

Herein, the transformation in the θ direction has to be performed while considering a relative position of each motor from the center of the moving body.

For instance, when receiving position commands XYθ, the X-direction instruction value of the M1 coordinate transformation unit is a position command value on the coordinates of the vibration type motor M1 and the Y-direction component thereof is zero when the θ direction is ignored.

Similarly, the instruction values in the X, Y and θ directions for the vibration type motors M2 and M3 also are allocated depending on the relationship of angles with driving vectors.

Meanwhile, detecting positions X, Y and θ obtained by a XYθ coordinate transformation unit 308 are input to the motor coordinate transformation unit 1101 and are transformed into values on the motor coordinate positions.

Then, the position commands and the detecting positions that are transformed into the three motor coordinate positions are input to a deviation calculating unit 1102 for calculation of a difference. This is position deviation of each vibration type motor.

Next, the position deviation of the three vibration type motors is input to a PID compensator 1103. The PID compensator 1103 includes three PID compensators, each of which is provided to control the corresponding vibration type motor.

Herein, when the three vibration type motors have the same driving force, identical control gain is set therefor basically.

Then, control signals for the vibration type motors output from the PID compensator 1103 contain information such as a frequency, a phase difference and a pulse width, which become driving parameters, and the control signals are input to a pulse generator 304.

Pulse signals output from the pulse generator 304 are input to a driving circuit 305, from which AC voltage of two phases which differ in phase by 90° is output.

The AC voltage output from the driving circuit 305 is applied to the piezoelectric elements of the vibration type motor 2, 3 and 4 (hereinafter called M1, M2 and M3), so that the moving body 5 operates in the vector-synthesized direction of the driving forces of M1, M2 and M3.

The operation of the moving body 5 is detected by the position sensors 6, 7 and 8, and a position detecting unit 307 performs arithmetic operation of positional information at each sensor position as X1, Y1 and Y2. The positional information X1, Y1 and Y2 is input to the XYθ coordinate transformation unit 303 and undergoes coordinate transformation as positional information of X, Y and θ.

In this way, feedback control is performed for the individual motors by the PID compensators so as to bring close to the position commands X, Y and θ.

SUMMARY OF THE INVENTION

The above conventional example has the following problem.

Such a multi-degree freedom driving device shows different transfer characteristics in the driving directions (movement directions) of X, Y and θ between the case of the device being placed horizontally on the XY plane and the case of the device being placed vertically. The control system of the conventional example, however, does not consider such a difference in transfer characteristics, and so cannot always achieve satisfactory control performance.

For instance, there is an influence by gravity in the Y direction. Then for the use as a vibration absorption mechanism of a camera including a lens disposed at the center of the moving body 5, when the lens is driven, in the XY directions, the vibration type motors (vibrators) M2 and M3 generating driving forces in the Y direction will be influenced by gravity corresponding to the mass of the lens.

This degrades gain and phase delay in transfer characteristics in the Y direction compared with those in the X direction.

Such a tendency becomes more prominent as the frequency for vibration absorption increases, i.e., the acceleration increases.

As a result, the control system becomes instable because of imbalance of the controlled amounts among the vibration type motors (vibrators) resulting from the influences in the Y direction, thus degrading position deviation and responsivity.

One aspect of the present invention relates to a motor control device to make up an actuator enabling multidirectional driving by vector-synthesizing driving forces of a plurality of motors. Such a device achieves coordinated control while considering a difference in transfer characteristics of the synthesized driving force between at least two mutually crossing directions, whereby controllability of position deviation and responsivity can be improved. Another aspect of the present invention relates to an actuator including the control device, an image blur correction device, a replacement lens, an imaging device and an automatic stage.

One aspect of the present invention relates to a control device, and the control device includes: a deviation calculating unit configured to output a first deviation signal and a second deviation signal for a first direction and a second direction crossing the first direction, respectively, based on a difference between a position command and positional data on a moving body; a compensation unit that outputs a first control signal and a second control signal based on the first deviation signal and the second deviation signal, respectively; and a controlled amount calculating unit that outputs at least a first signal regarding a driving parameter for a first motor and a second signal regarding a driving parameter for a second motor, based on the first control signal and the second control signal.

Another aspect of the present invention relates to an actuator including the control device, an image blur correction device, a replacement lens, an imaging device and an automatic stage.

Further features of the present invention will become apparent from the following description of exemplary embodiments with reference to the attached drawings.

BRIEF DESCRIPTION OF THE DRAWINGS

FIG. 6A describes a matrix calculation expression of the multi-input-multi-output matrix calculating unit.

FIG. 6B describes a matrix calculation expression of the multi-input-multi-output matrix calculating unit.

FIG. 6C describes a matrix calculation expression of the multi-input-multi-output matrix calculating unit.

DESCRIPTION OF THE EMBODIMENTS

Preferred embodiments of the present invention will now be described in detail in accordance with the accompanying drawings.

Embodiment 1

The following exemplifies a vibration type multi-degree freedom driving device as an actuator (multi-degree freedom driving device) capable of driving a moving body multidirectionally in one embodiment of the present invention.

The following describes, as one embodiment of the present invention, an exemplary structure where a multi-degree freedom driving device including a motor control device of the present invention is applied to a vibration absorption mechanism (image blur correction device) for a camera as an optical apparatus. Although the present embodiment describes the exemplary structure of installation in a camera, the present invention is not limited to this, and is applicable to a control device at a stage or the like.

A vibration type multi-degree freedom driving device of the present, embodiment includes a plurality of vibrators configured so that vibrations are excited by the application of AC voltage.

Then the moving body in contact with the plurality of vibrators is driven by a driving force due to a friction force, where the driving force includes vector-synthesized driving forces of the plurality of vibrators and can drive the moving body multidirectionally.

Figure 1A:
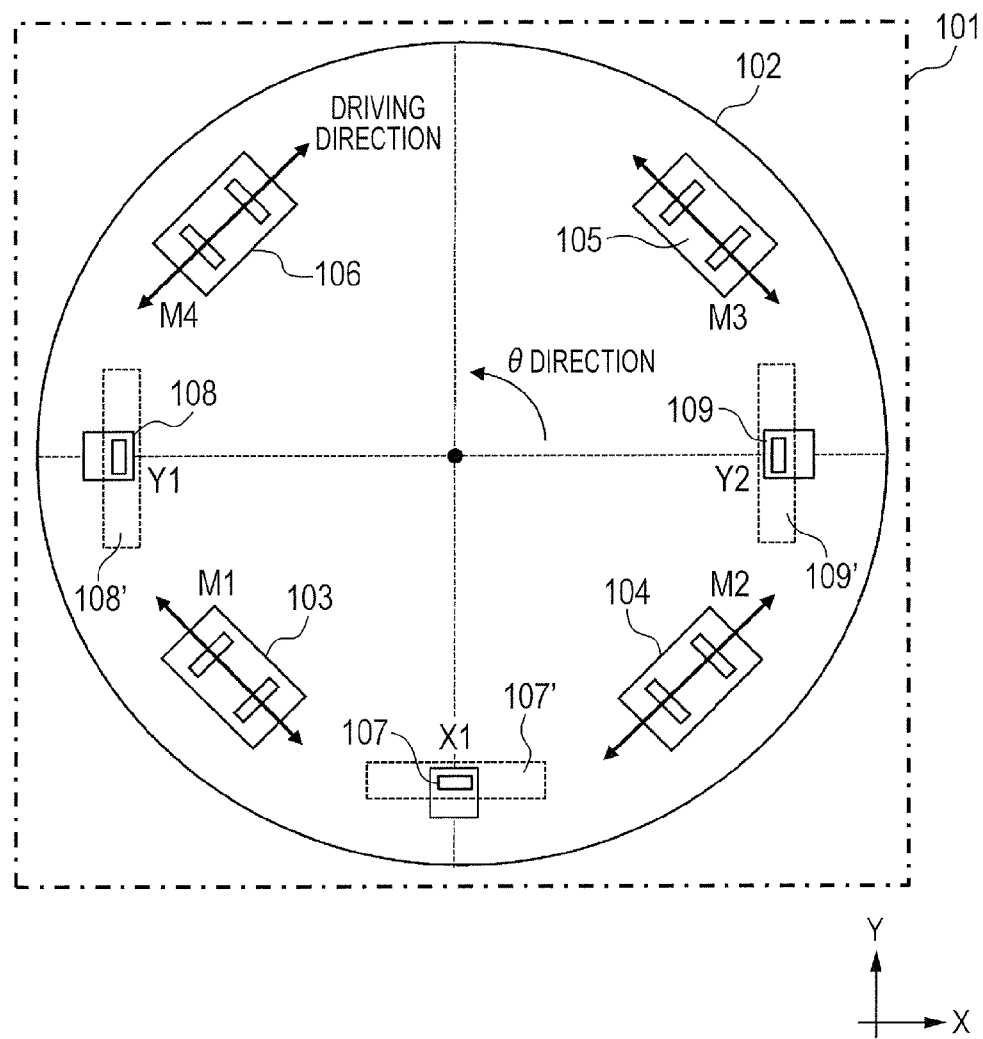
FIG. 1A describes an exemplary structure of a multi-degree freedom driving device.
Figure 1B:
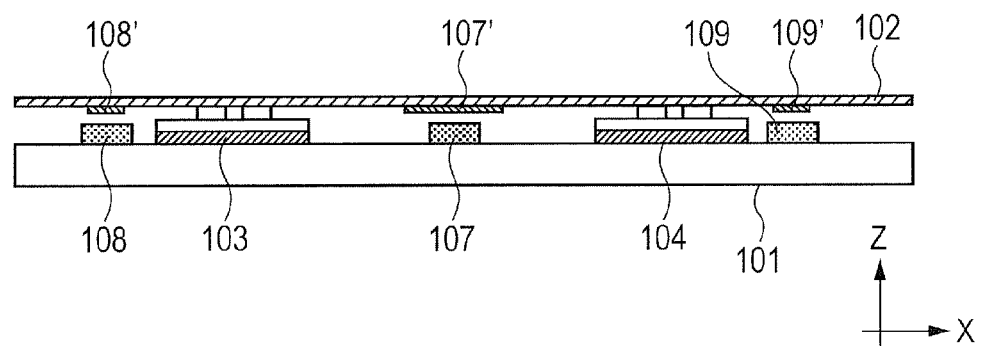
FIG. 1B describes an exemplary structure of a multi-degree freedom driving device.

Specifically as shown in FIGS. 1A and 1B, a linear vibration type driving device implementing the driving of the moving body in the XYθ directions (first, second and third directions) is configured, using a plurality of a linear vibration type motors.

A vibration absorption mechanism for a camera includes a two-axis gyro-sensor, thus detecting the amount of vibrations in the XY directions on the XY coordinates that are two Cartesian coordinates in one plane and generating position command signals XY to correct the vibrations.

That is, the mechanism controls a multi-degree freedom driving device based on the position command signals so as to move a lens as the moving body for vibration absorption of the camera.

FIG. 1A shows the structure of a vibration type multi-degree freedom driving device of the present embodiment.

A base plate 101 is a base of the vibration type multi-degree freedom driving device, and vibration type motor (vibrators) 103, 104, 105 and 106 drive a moving body 102.

Herein, for the use as a vibration absorption mechanism for a camera, the moving body 102 corresponds to a lens part.

A position sensor 107 detects an X-direction position and position sensors 108 and 109 detect a Y-direction position.

FIG. 1B is a side view of the device.

The vibration type motors 103, 104, 105 and 106 each include a vibration member having two protrusions and a piezoelectric element (not illustrated), which are integrated by bonding or the like, and are attached to the base plate 101 via an attachment member.

Scale parts 107', 108' and 109' are provided at a face above the position sensors 107, 108 and 109.

For instance, as the scale part 107' moves in the X-direction (the first direction), the sensor 107 outputs a positional signal corresponding to the movement amount. As the scale part 108' and the scale part 109' move in the Y-direction (the second direction), the sensors 108 and 109 output positional signals corresponding to the movement amounts, respectively.

Thus the moving body is moved in the direction that is a vector-synthesized direction of the driving forces of the vibration type motors 103, 104, 105 and 106.

While a case where ail driving force generation axes of the vibration type motors 103, 104, 105 and 106 cross the X-direction (the first direction) and the Y-direction (the second direction) is described, the present invention is not limited thereto. At least one of the driving force generation axes of the vibration type motors 103, 104, 105 and 106 may be parallel to at least one of the X-direction and the Y-direction. Note that, in a case where the driving force generation axis of at least one of the vibration type motors 103, 104, 105 and 106 crosses the X-direction and the Y-direction, the control device of the present invention achieves more accurate coordinated control of transfer characteristics of synthesized driving forces of the vibration type motors 103, 104, 105 and 106, whereby controllability of position deviation and responsivity can be further improved.

Figure 2A:
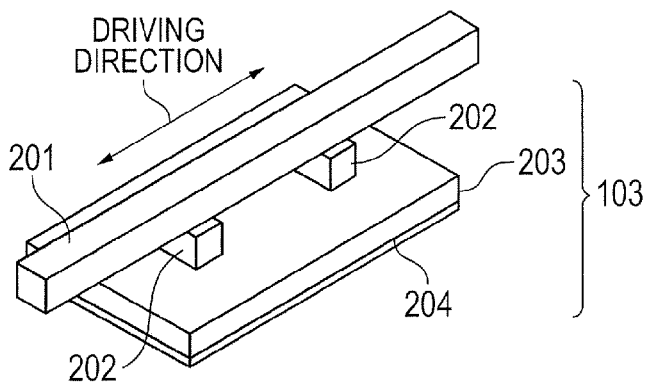
FIG. 2A describes driving principle of a linear vibration type driving device.
Figure 2B:
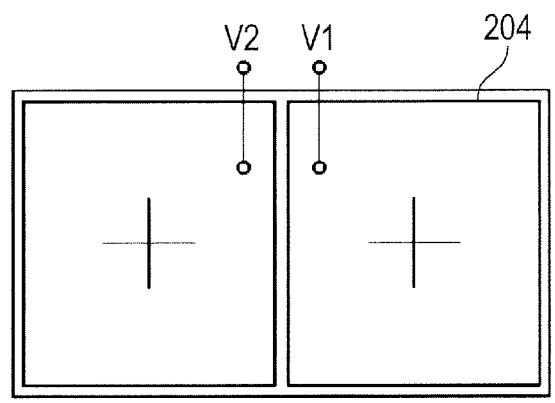
FIG. 2B describes driving principle of a linear vibration type driving device.
Figure 2C:
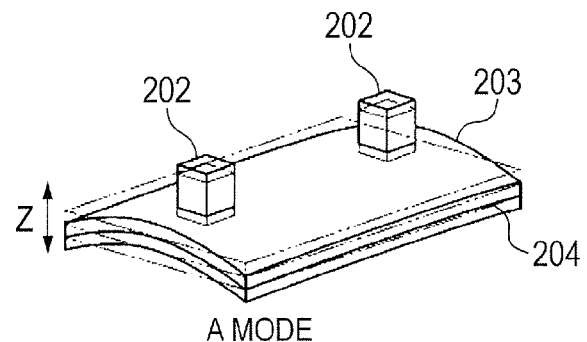
FIG. 2C describes driving principle of a linear vibration type driving device.
Figure 2D:
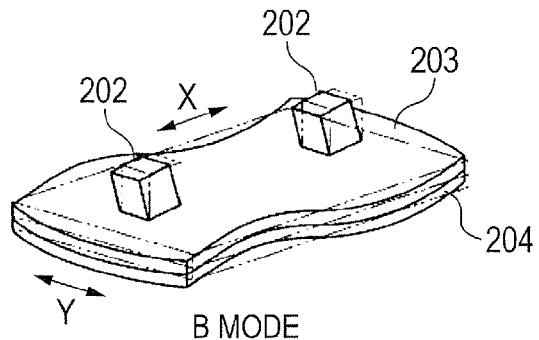
FIG. 2D describes driving principle of a linear vibration type driving device.

FIGS. 2A to 2D describe the driving principle of the linear vibration type motors of the present embodiment. AC voltage applied to a piezoelectric element 204 bonded to an elastic body 203 in FIG. 2A generates two vibration modes as shown in FIGS. 2C and 2D, thus moving the moving body 201 that is in pressurized-contact with protrusions 202 in the direction of the arrow.

FIG. 2B shows the pattern of an electrode of the piezoelectric element 204. For instance, the piezoelectric element 204 of the vibration type motor 103 is formed with electrode regions that are separated in half in the longitudinal direction.

These electrode regions have the same polarization direction (+).

To the electrode region on the right of FIG. 2B of the two electrode regions of the piezoelectric element 204, AC voltage (V1) is applied, and to the electrode region on the left, AC voltage (V2) is applied.

When V1 and V2 are AC voltage at a frequency around the resonant frequency of A mode and of the same phase, then the piezoelectric element 204 as a whole (the two electrode regions) expands at a certain instant and contracts at another instant.

As a result, the vibration type motor 103 generates A mode vibrations shown in FIG. 2C.

When V1 and V2 are AC voltage at a frequency around the resonant, frequency of B mode and of the phases shifted by 180°, then the electrode region on the right of the piezoelectric element 204 contracts and the electrode region on the left expands at a certain instant.

At another instant, this relationship becomes reverse. As a result, the vibration type motor 103 generates B mode vibrations shown in FIG. 2D.

In this way, two vibration modes are synthesized, whereby the moving body 201 is driven in the direction of the arrow in FIG. 2A.

The generation ratio of A mode and B mode can be changed by changing a phase difference of the AC voltage input to the electrodes separated into half.

This vibration type motor can change the speed of the moving body by changing the generation ratio.

Figure 3:
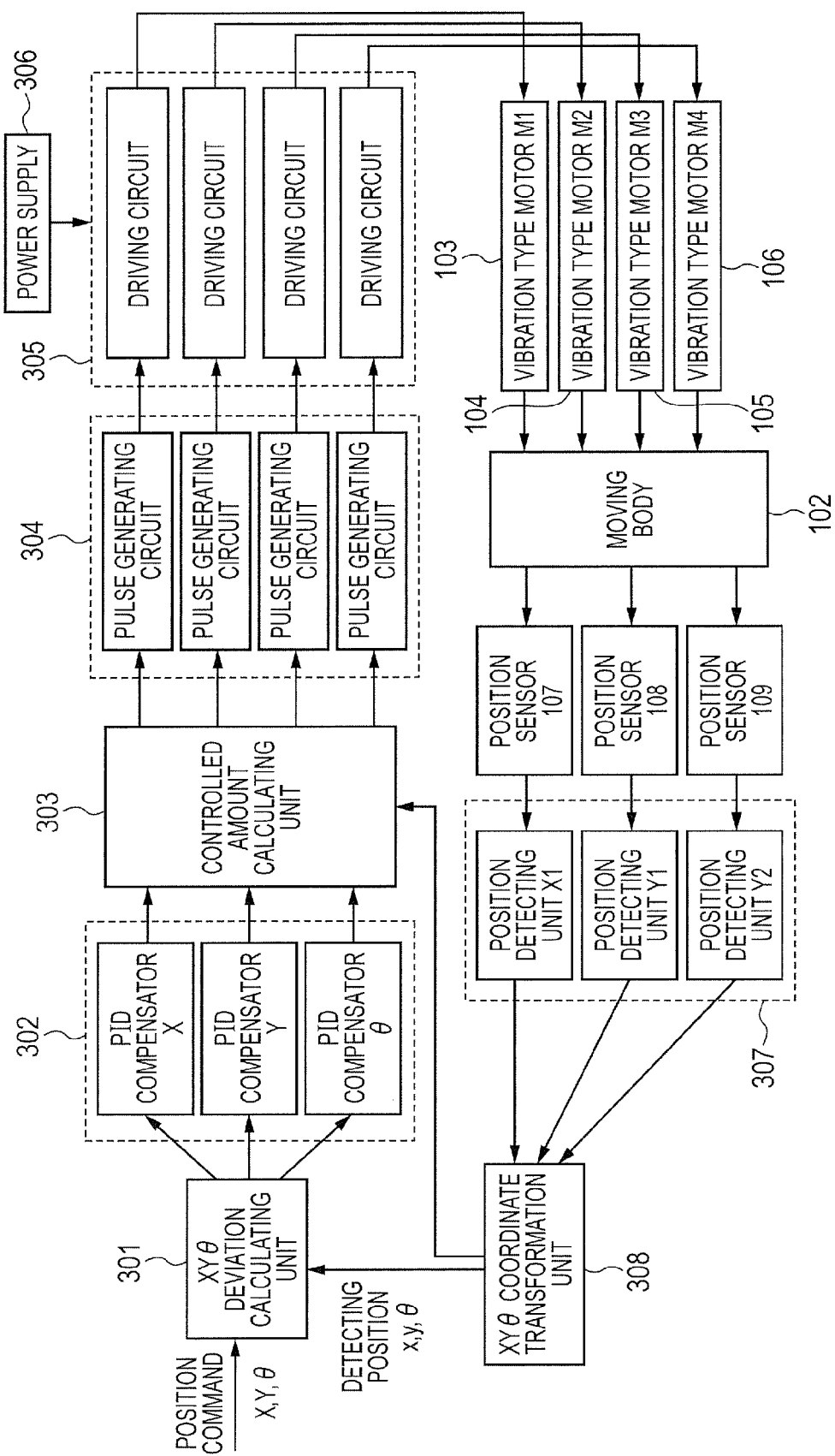
FIG. 3 describes a control system of a multi-degree freedom driving device.

FIG. 3 describes a control system of the multi-degree freedom driving device in one embodiment of the present invention.

The control system at least includes a vibration type motor, a moving body, a position sensor and a control device. The control system in this example includes vibration type motor 103 to 106, a moving body 102, position sensors 107 to 109 and a control device, for example. The control device includes a controller, a pulse generator, a driving circuit, a position detecting unit and a coordinate transformation unit. The control device in this example includes a controller, a pulse generator 304, a driving circuit 305, a position detecting unit 307 and a XYθ coordinate transformation unit 308, for example. The controller further includes a deviation calculating unit, a compensator (compensation unit) and a controlled amount calculating unit. The control device in this example includes a XYθ deviation calculating unit 301, a PID compensator 302 and a controlled amount calculating unit 303, for example.

In the control system of the multi-degree freedom driving device, a controller not illustrated gives position commands X, Y and θ, which are input to the XYθ deviation calculating unit 301.

A difference between this and detecting positions X, Y and θ obtained at the XYθ coordinate transformation unit 308 is calculated, whereby deviation signals of X, Y and θ are output.

The deviation signals are input to the PID compensator 302 making up control means, from which control signals for X, Y and θ are output.

Herein, the PID compensator 302 refers to the addition of outputs from compensators having functions of proportion (P), integral (I) and differentiation (D), and is used to compensate for phase delay and gain of the control target and to configure a stable and precise control system. The PID compensator has a fixed control period for the controller to perform feedback control, and time proportion calculation, time differentiation calculation and time integral calculation are performed based on this control period. The compensation unit is a calculation unit to compensate for phase delay or gain of the positional data of the moving body with respect to the position commands. As the compensator, an H infinite compensator, a repetitive compensator may be used, for example, all of which are configured so as to combine calculations based on temporal concepts. The compensator may be considered as a so-called filter, from which action based on a temporal concept, i.e., action of amplification or attenuation of input signals in accordance with the frequency can be obtained. The compensator of the present invention is not limited to these compensators, and any compensator may be used as long as the aforementioned effects can be obtained.

In the present embodiment, as described later, this PID compensator 302 is configured so as to enable adjustment of control gain in the X, Y and θ directions in accordance with a difference among the X, Y and θ directions in transfer characteristics of the driving force that is obtained by synthesizing the driving forces of the vibrations type motors. Then, control signals subjected to adjustment of control gain are output from the PID compensator 302, and are input to the controlled amount calculating unit 303.

This controlled amount calculating unit 303 includes a below-described multi-input-multi-output matrix calculating unit that transforms controlled amounts of X, Y and θ by matrix calculation and outputs controlled amounts for four vibration type motors.

At this time, the present embodiment calculates a control signal subjected to adjustment of control gain and a coefficient that is determined by a relative angle between the driving force generation axis of each vibration type motor and the driving direction axis (X, Y and θ directions) of the moving body, and calculates a driving parameter of each vibration type motor.

In this way, the PID compensator 302 outputting a control signal subjected to adjustment of control gain in the X, Y and θ directions and the controlled amount calculating unit calculating a driving parameter for each vibration type motor in the present embodiment are disposed in the path of the control system that performs feedback control for the position commands.

Thereby, the control parameter of each vibration type motor can be set so as to be optimized for the gain while giving a consideration into a difference in transfer characteristics among X, Y and θ directions, whereby precise coordinated control having large control margin can be achieved as compared with the conventional technique.

The thus calculated driving parameters for the vibration type motors (vibrators) include information on a frequency, a phase difference and a pulse width, and signals regarding these driving parameters for the vibration type motors are output from the controlled amount calculating unit 303 and then are input to the pulse generator 304.

The pulse generator 304 generates a pulse signal whose driving frequency changes with the input control signal, and a digital frequency-dividing circuit, a VCO (voltage controlled oscillator) or the like may be used therefor.

Alternatively, PWM (pulse width modulation) control may be performed to generate a pulse signal whose pulse width changes with the control signal.

The pulse signal output from the pulse generator 304 is input to the driving circuit 305, from which AC voltage of two phases which differ in phase by 90° is output.

The driving circuit 305 causes switching operation of DC voltage supplied from a power supply 306 at a timing of the input pulse signal, for which a booster circuit using a transformer to boost to desired voltage or a booster circuit using LC resonance may be used.

The AC voltage output from the driving circuit 305 is applied to piezoelectric elements of the vibration type motors 103, 104, 105 and 106 (hereinafter called M1, M2, M3 and M4), so that the moving body 102 operates in the vector-synthesized direction of the driving forces of M1, M2, M3 and M4.

A relative position of the moving body 102 is detected by the position, sensors 107, 108 and 109, and the position detecting unit 307 performs arithmetic operation of positional information at each sensor position as X1, Y1 and Y2.

The positional information X1, Y1 and Y2 is input to the XYθ coordinate transformation unit and undergoes coordinate transformation as positional information of X, Y and θ. In this way, the present device performs feedback control so as to bring close to the position commands X, Y and θ.

Figure 4:
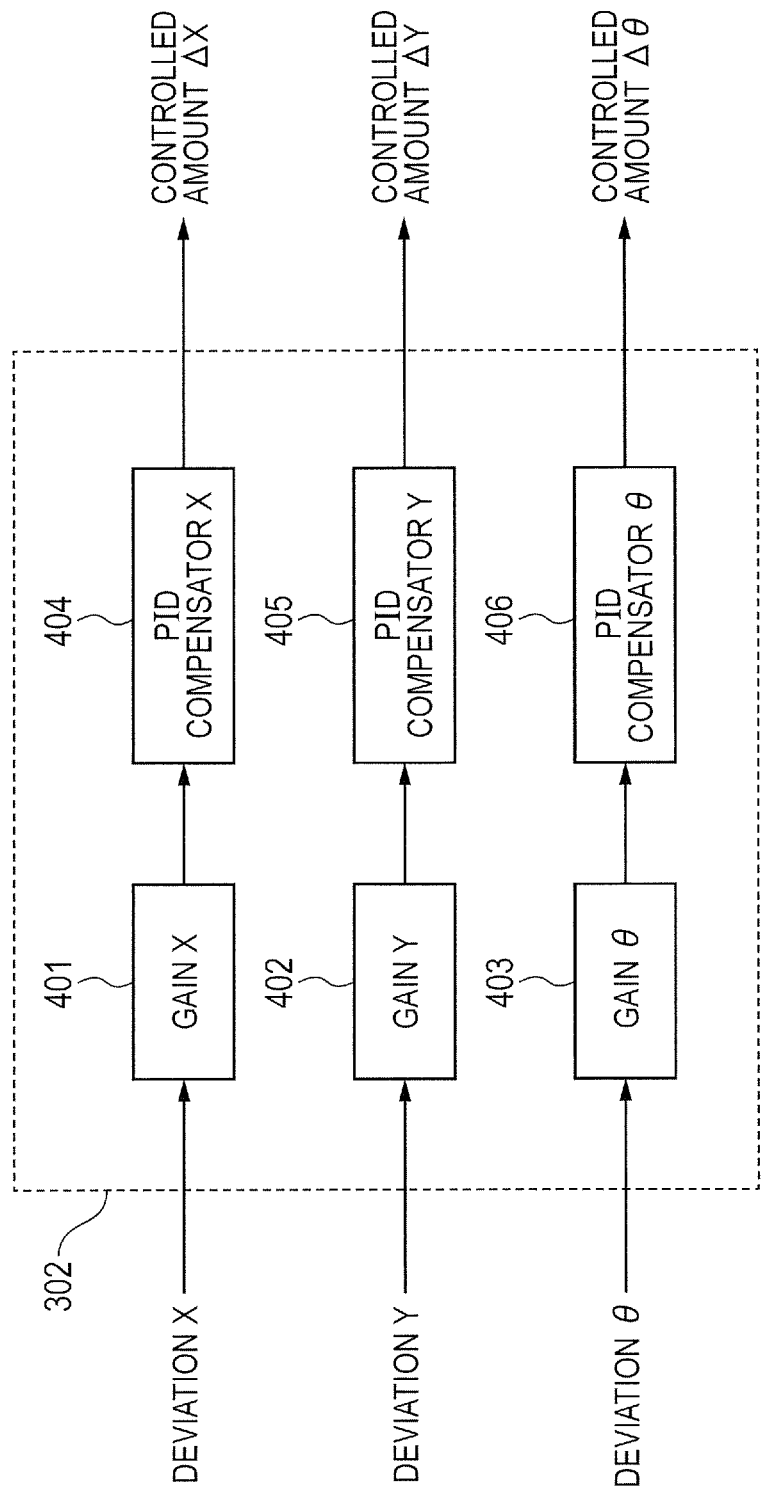
FIG. 4 describes a control system of a PID compensator.

FIG. 4 describes a control system of the PID compensator 302 in the present embodiment. Deviation signals of X, Y and θ are each provided with gain, which are calculated by the PID compensator for outputting.

Gain X 401, gain Y 402 and gain θ 403 enable adjustment of the ratio of control gain in these directions.

This enables free control of each controlled amount of XYθ for coordinated control of a plurality of vibrators, thus increasing the degree of freedom in designing for control.

For each of a PID compensator X 404, a PID compensator Y 403 and a PID compensator θ 406, optimized control gain is set based on the transfer characteristics when the plurality of vibrators are driven individually in each direction, whereby coordinated control of a plurality of vibrators is enabled.

Figure 5:
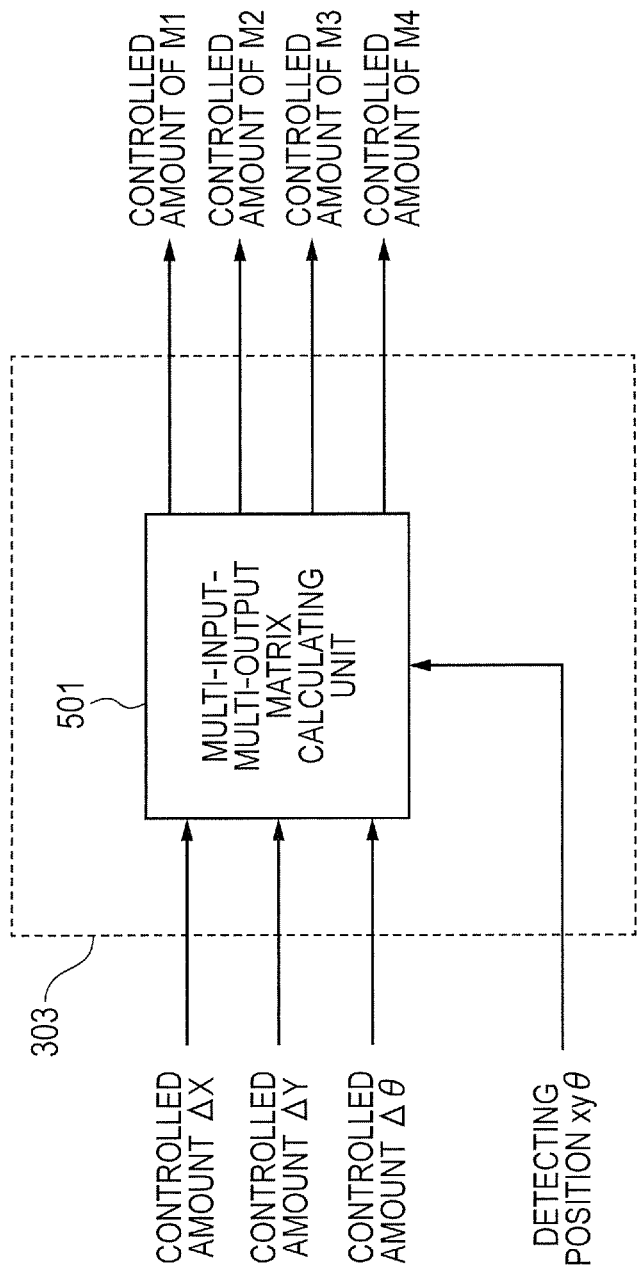
FIG. 5 describes a multi-input-multi-output matrix calculating unit included in a controlled amount calculating unit.

FIG. 5 describes the structure of a multi-input-multi-output matrix calculating unit 501 included in the controlled amount calculating unit 303.

Each controlled amount of X, Y and θ undergoes matrix calculation by the multi-input-multi-output matrix calculating unit 501 in accordance with the detecting positions X, Y and θ, and is transformed into a controlled amount for each of four vibration type motors.

As a result, a frequency, a phase difference and a pulse width, which are driving parameters of the vibration type motor M1, M2, M3, and M4, are adjusted in accordance with the controlled amount.

FIGS. 6A to 6C describe matrix calculation expressions of the multi-input-multi-output matrix calculating unit 501.

The controlled amounts of the vibration type motor M1, M2, M3, and M4 are represented in FIG. 6A.

Coefficient COS (45 deg) is set because the drive axis of each vibration type motor is disposed with the gradient of 45° with reference to the XY axes.

The first term is a controlled amount ΔX component, the second item is a controlled amount ΔY component, and the third term is a controlled amount Δθ component. The controlled amount ΔX reflects the transfer characteristics in the X direction, the controlled amount ΔY reflects the transfer characteristics in the Y direction, and the controlled amount Δθ reflects the transfer characteristics in the θ direction. Thus, when the device is vertically disposed, a difference in transfer characteristics between X and Y directions can be considered as a difference between the controlled amounts ΔX and ΔY and thus the controlled amount for each vibration type motor can be calculated.

Herein, the first term vector and the second term vector differ in sign between their X and Y components. This is because, when a driving signal of the same phase is applied, the driving directions of the vibration type motors are all set in the left rotating direction.

FIG. 6B shows rotation matrix Rθ to calculate a controlled amount θ component. The rotation matrix Rθ calculates a rotation amount of the controlled amount Δθ with reference to the central point (setting the central point as the rotating center) using distance d3 along the X-coordinate axis and Y-coordinate axis from the central point of the XY coordinates to each vibration type moor shown in FIG. 6C.

When the moving body moves in the X and Y directions, then the relative central coordinates with reference to the vibration type motors is displaced. Then, detecting positions x and y are considered as offset components.

FIGS. 7A to 7E describe the operation of the multi-degree freedom driving device of the present embodiment in the X, Y and θ directions.

This device performs vector synthesis of the driving forces of the four vibration type motor M1, M2, M3 and M4 and drives the moving body in a desired direction.

The following describes a selected typical operation pattern.

Figure 7A:
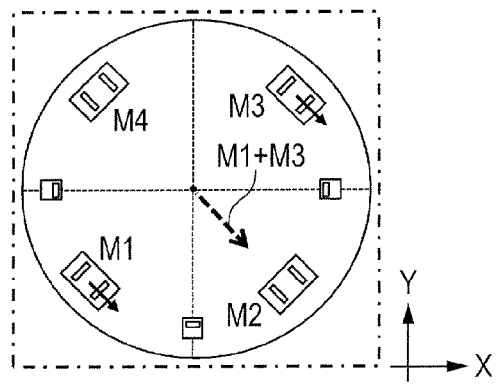
FIG. 7A describes the operation of a multi-degree freedom driving device in the X, Y and θ directions.

FIG. 7A describes the case of driving in the diagonally downward and right direction. In this case, driving forces in the same direction are generated at M1 and M3.

Herein, it is desirable that M2 and M4 do not generate any load for the driving in the diagonally downward and right direction. To this end, stationary waves are excited at M2 and M4 for driving in the vertical direction only so as to reduce the load, or the load may be reduced by an avoiding mechanism.

Figure 12A:
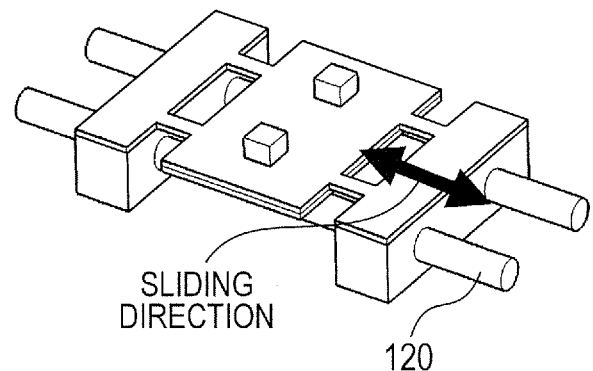
FIG. 12A describes an exemplary structure to reduce load using an avoiding mechanism.
Figure 12B:
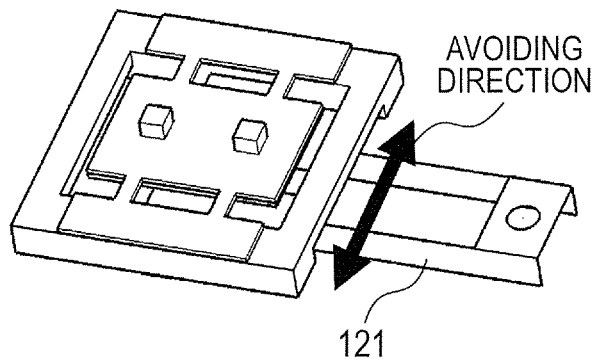
FIG. 12B describes an exemplary structure to reduce load using an avoiding mechanism.

FIGS. 12A and 12B show exemplary structures to reduce load using an avoiding mechanism.

FIG. 12A shows an exemplary structure using a sliding mechanism. A vibration type motor is slid in the arrow direction via a bar 120 fixed to the base plate, whereby load can be released.

FIG. 12B shows an exemplary structure using an avoiding mechanism. A plate spring 121 fixed to the base plate has low stiffness in the arrow direction and so is deformed in the avoiding direction, whereby the vibration type motor can release load.

Figure 7B:
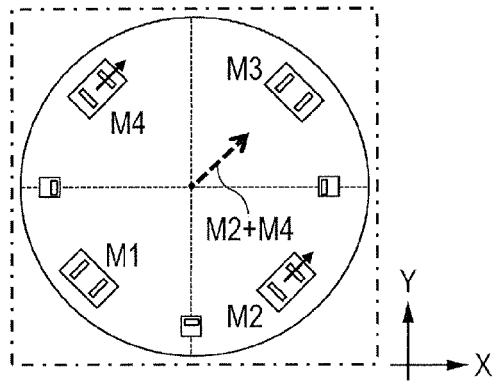
FIG. 7B describes the operation of a multi-degree freedom driving device in the X, Y and θ directions.

FIG. 7B describes the case of driving in the diagonally upward and right direction. In this case, driving forces in the same direction are generated at M2 and M4.

Figure 7C:
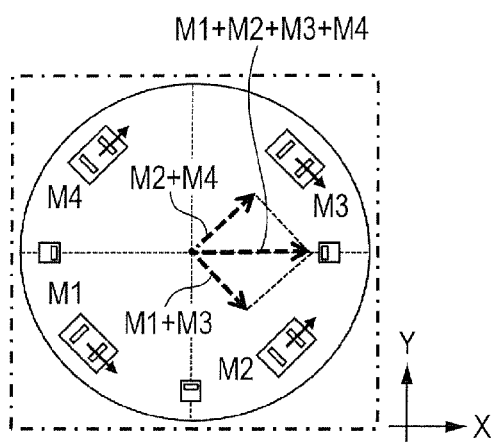
FIG. 7C describes the operation of a multi-degree freedom driving device in the X, Y and θ directions.
Figure 7D:
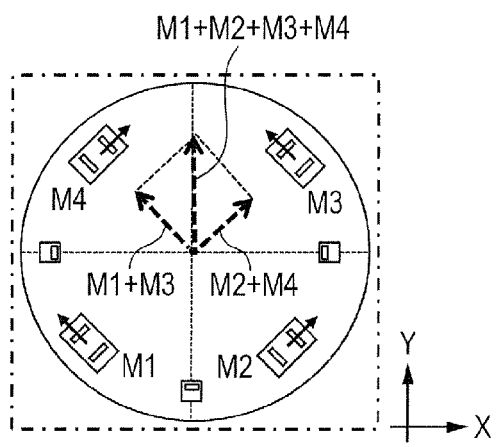
FIG. 7D describes the operation of a multi-degree freedom driving device in the X, Y and θ directions.

FIG. 7C describes the case of driving in the X direction. When the synthesized vector of M1 and M3 and the synthesized vector of M2 and M4 are of the same magnitude, then the synthesized vector is generated in the X direction as shown in this drawing. Similarly, FIG. 7D describes the case of driving in the Y direction.

Figure 7E:
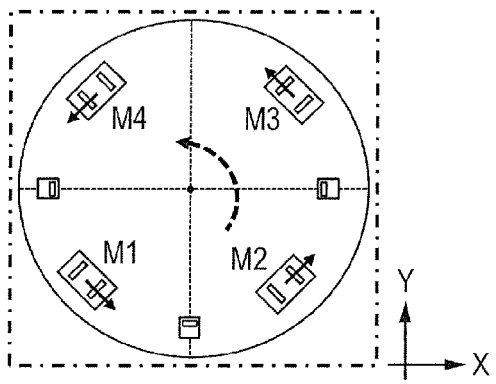
FIG. 7E describes the operation of a multi-degree freedom driving device in the X, Y and θ directions.

FIG. 7E describes the case of driving in the left rotating direction. In this case, all of the driving forces may be generated in the same direction.

Such operation is applied to a vibration absorption mechanism for a camera, whereby vibration absorption operation is enabled in accordance with an instruction signal from a gyro-sensor built in the camera not illustrated.

Figures 8A, 8B:
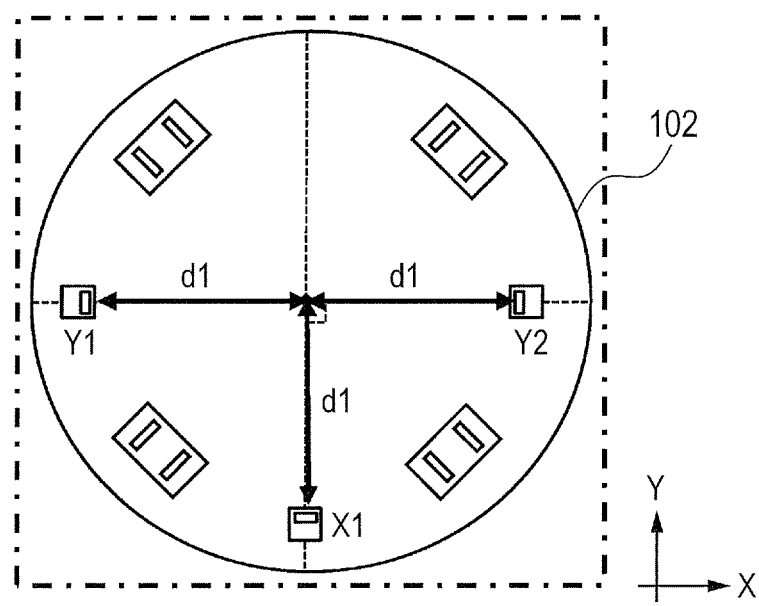
FIG. 8A describes an expression for coordinate transformation of a position sensor signal into X, Y and θ.
FIG. 8B describes an expression for coordinate transformation of a position sensor signal into X, Y and θ.

FIGS. 8A and 8B describe expressions for coordinate transformation of a position sensor signal into X, Y and θ.

As shown in FIG. 8B, the position of the moving body 102 is detected by three position sensors. Herein, the distance from the central point to the position sensors is d1.

Positional information at each sensor position is calculated as X1, Y1 and Y2. Positional information X1, Y1 and Y2 undergoes coordinate trans formation as the positional information of X, Y and θ by the expressions shown in FIG. 8A. The coordinate transformation is based on the idea that the X direction is calculated using X1 and the rotating angle, the Y direction is calculated using the average value of Y1 and Y2 and the θ direction is calculated using a difference between Y1 and Y2.

Figure 9:
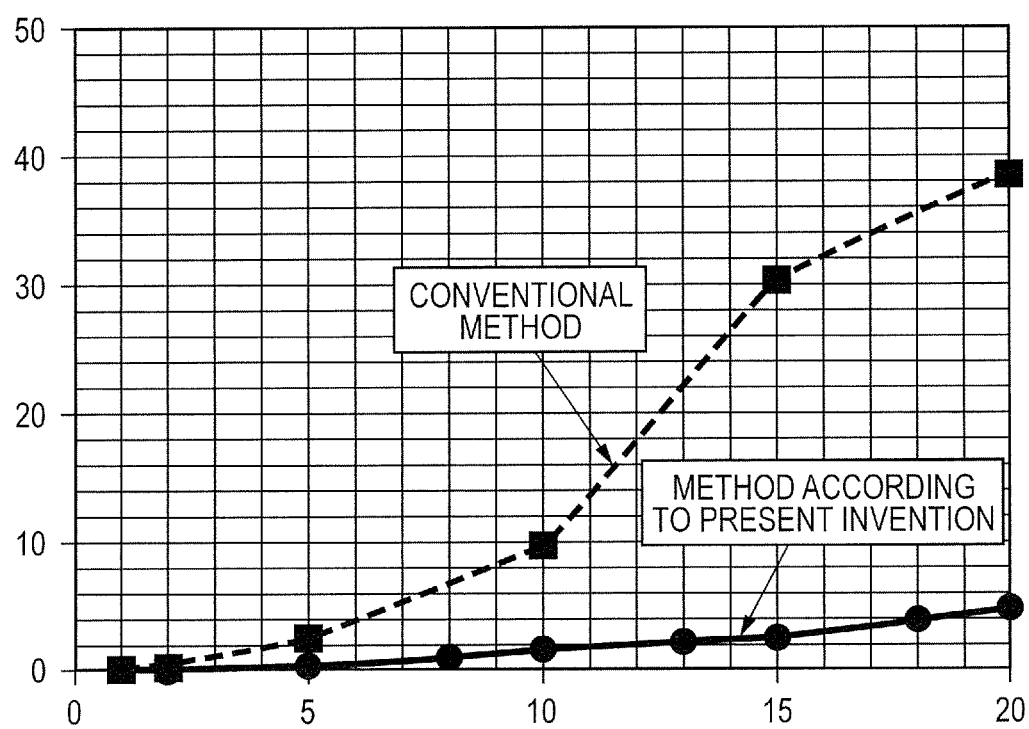
FIG. 9 describes the advantageous effect when the control system is used in an actual device.
Figure 10A:
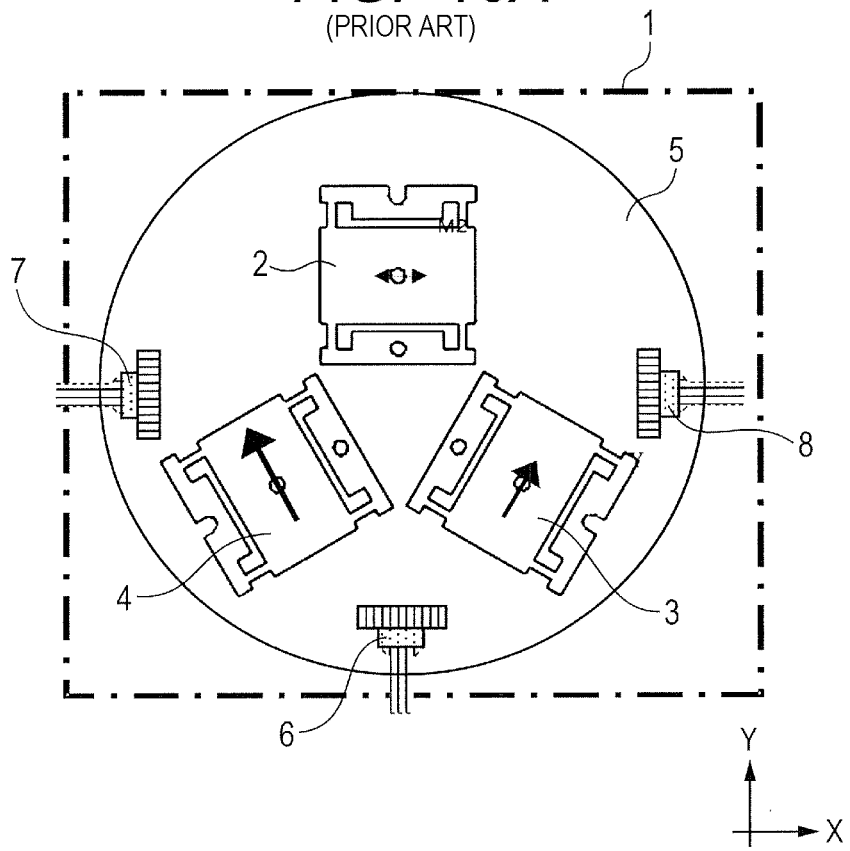
FIG. 10A shows the structure of a multi-degree freedom driving device.
Figure 10B:
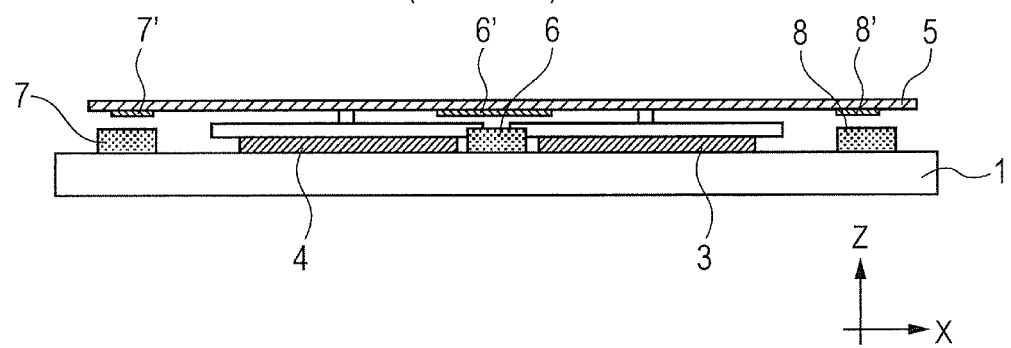
FIG. 10B shows the structure of a multi-degree freedom driving device.
Figure 11:
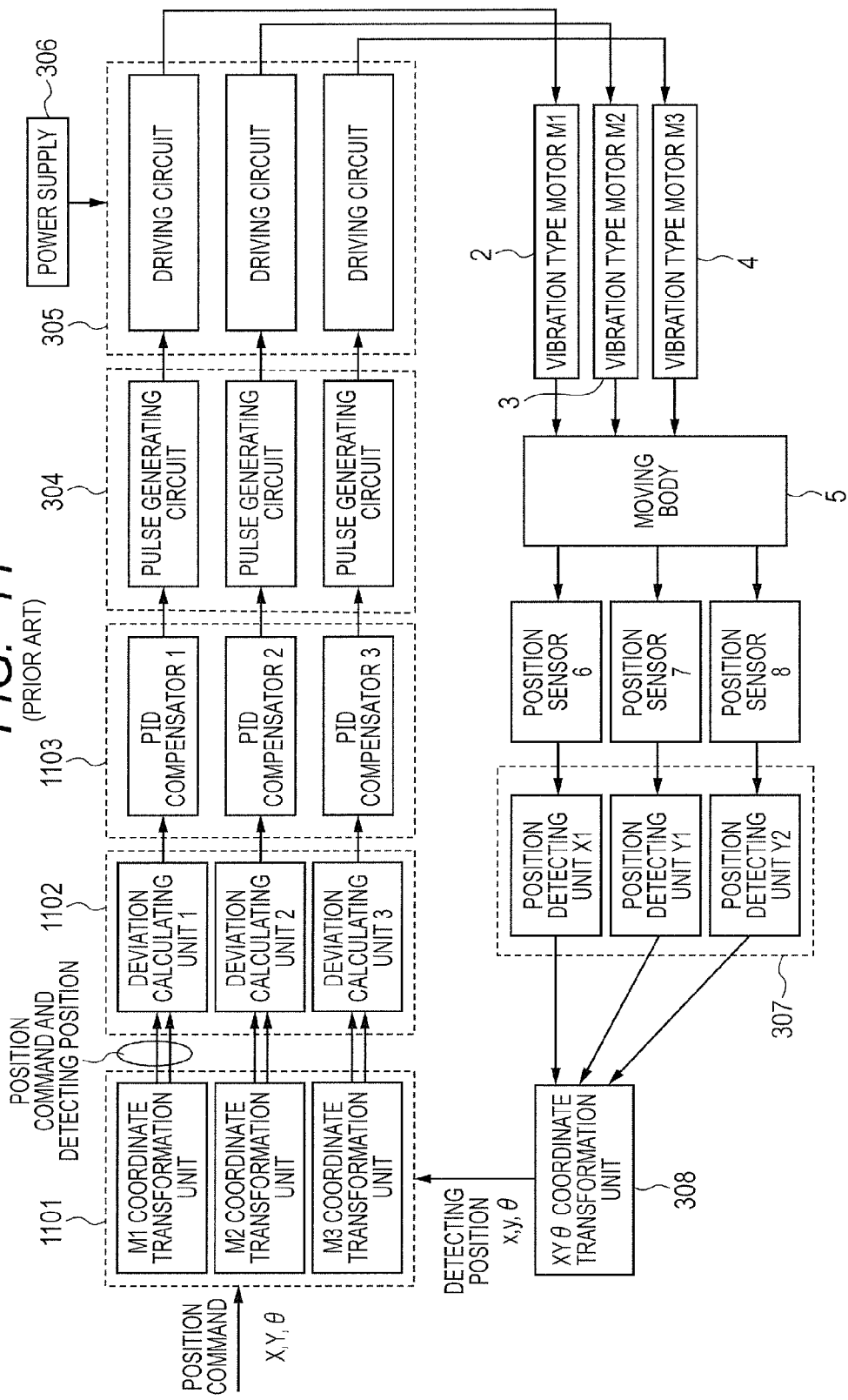
FIG. 11 shows a control system of a multi-degree freedom driving device.

FIG. 9 describes the advantageous effect when the control system of the present embodiment is used in an actual device.

The position command X and the position command Y have ±1 mm strokes of the same phase, and reciprocating motion in SIN waveform at 1 to 20 Hz is performed. The horizontal axis represents frequencies and the vertical axis represents position deviation ratios.

Herein, the position deviation ratio is defined as a ratio of position deviation to the amplitude of the SIN waveform. That is, a smaller position deviation ratio means higher position following capability.

This measurement result shows a comparison using the same device between the conventional control method and the control method of the present invention. The device is disposed vertically, and measurement is performed under the condition where the gravity corresponding to the mass of the moving body is applied in the Y direction. That is, transfer characteristics differs between the X direction and the Y direction so as to achieve the advantageous effect of the present invention.

The method according to one aspect of the present invention measures transfer characteristics during driving of the multi-degree freedom driving device in the X and Y directions individually, and optimizes control gain of the PID compensator based on the transfer characteristics in these directions. The method then decreases control gain in the θ direction, thus increasing control margin in the XY directions. In this way, the method of the present invention has a feature of high degree of freedom for designing to stabilize the control system.

As shown in FIG. 9, the method of the present invention results in small position deviation ratios. Such an effect increases with the frequency.

As stated above, the configuration of the present embodiment per forms multi-input-multi-output matrix calculation for a multidirectional instruction. Thereby, gain can be optimized while giving consideration to a difference in transfer characteristics among the XYθ directions.

This means larger control margin than that of the conventional one, and enables control with higher gain as well as precise and high-responsive driving.

More specifically, optimum control gain can be set for each direction while considering a difference in transfer characteristics among a plurality of directions, whereby a plurality of vibrators can be coordinated-controlled, and so position deviation and responsivity can be improved.

The present invention is not limited to the configuration described in the above embodiment, and is applicable to any multidirectional driving using at least two motors. For instance, the present invention is widely applicable to any multidirectional driving using a plurality of vibrators.

For instance, the present invention is applicable to the configuration of XYθ-direction driving using three vibrators shown in the conventional example and the configuration of XY-direction driving using two vibrators.

The present embodiment describes the example considering a difference in transfer characteristics among X, Y and θ directions, and the present invention is not limited to this. The present invention is applicable to the case of driving a moving body in two directions including a first direction and a second direction only, where the first direction and the second direction may cross each other but may not cross each other at right angles.

The control device of the present embodiment performs coordinated control while considering a difference in transfer characteristics of the driving force, which is obtained by synthesizing the driving forces of the vibration type motors, among the X, Y and θ directions, and so enables improvement of controllability for position deviation and responsivity and enables driving of the moving body multidirectionally.

Embodiment 2

Embodiment 1 describes the example of using a vibration type motor as a motor, and the present invention is not limited to this and may use other types of motors.

Figure 13:
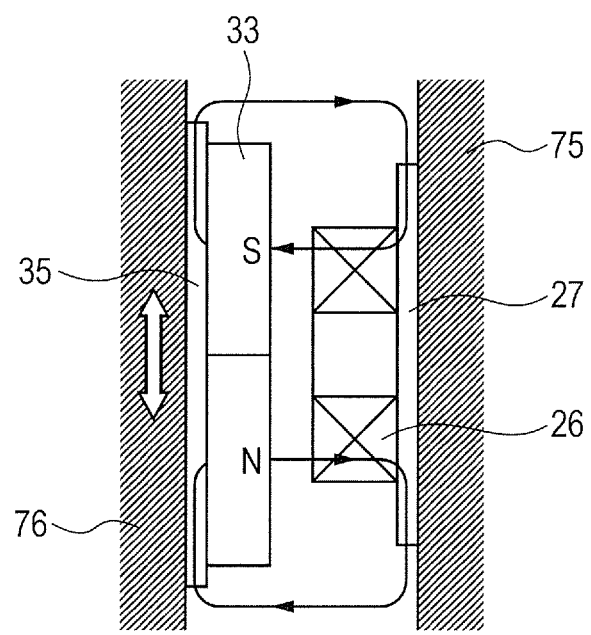
FIG. 13 is a cross-sectional view to describe an exemplary motor.

Referring to FIG. 13, the present embodiment describes an exemplary configuration which is different from Embodiment 1 only in the driving means. Embodiment 1 describes the case of using a vibration type multi-degree freedom driving device including vibration type motors as motors. Such a vibration type motor is configured so that the application of a driving signal to an electric-mechanical energy conversion element provided in a vibrator excites an elliptic motion at the vibrator, the elliptic motion resulting from two bending modes including first and second bending modes whose nodal lines cross each other substantially orthogonally, and a driving force occurs due to friction of the vibrator with a contact part.

The present embodiment describes an example of using, instead of such a vibration type motor, a so-called voice coil motor as driving means, where the voice coil motor includes a driving coil and a permanent magnet and converts electric energy into mechanical energy using magnetic flux generated by the permanent magnet.

FIG. 13 is a cross-sectional view of a voice coil motor. In the state of the drawing, the center of a driving coil 26 provided at a fixed part 75 resides on the center line of a permanent magnet 33. A magnetic force of the permanent magnet 33 generates a magnetic line indicated with the arrow of FIG. 13. Thus, when current flows through the driving coil 26 from right to left in the drawing, then a force to move a movable part 76 downward is generated. When current flows in the opposite direction, then a force to move the movable part 76 upward is generated. The voice coil motor includes a back yoke 35 and a suction yoke 27. The back yoke 35 and the suction yoke 27 are disposed so that their long sides and short sides overlap each other.

Figure 14A:
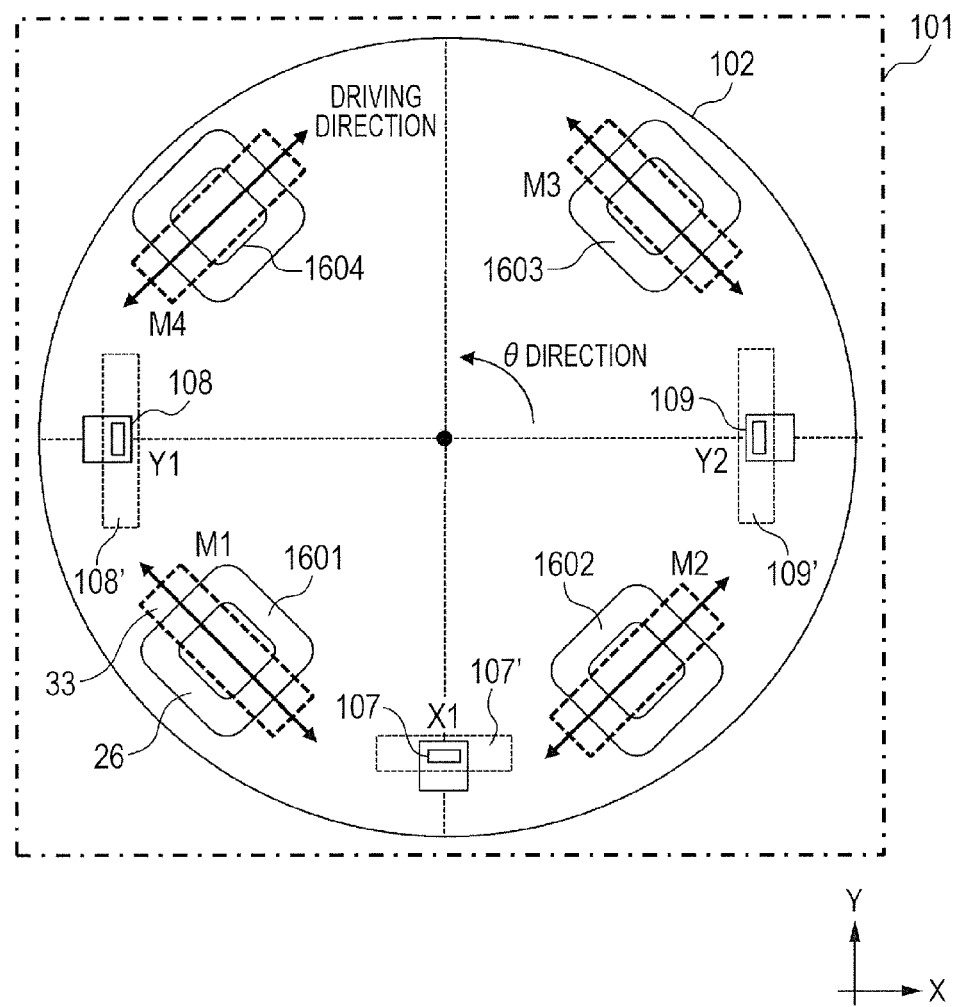
FIG. 14A describes the structure of a multi-degree freedom driving device.

FIG. 14A shows the structure of a multi-degree freedom driving device including a voice coil motor.

Four voice coil motors 1601, 1602, 1603 and 1604 are provided between a base plate 101 and a moving body 102. Each voice coil motor is disposed similarly to those of Embodiment 1, and the device is configured so as to move the moving body in the vector-synthesized direction of the driving forces of the motors.

Figure 14B:
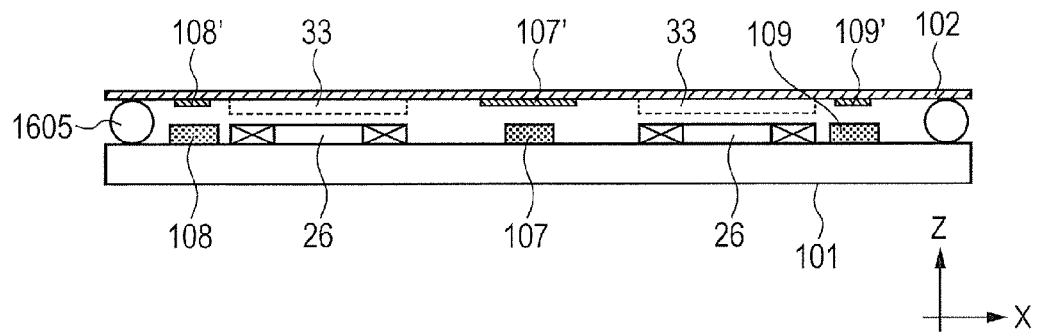
FIG. 14B describes the structure of a multi-degree freedom driving device.

FIG. 14B is a side view of the device. The driving coil 26 of each voice coil motor is attached to the base plate 101 and the permanent magnet 33 is attached to the moving body 102. The moving body 102 is supported by a steel ball 1605. The steel ball 1605 smoothly rolling between the base plate 101 and the moving body 102 causes the moving body 102 to perform translational motion and rotary motion in a plane orthogonal to the optical axis.

The multi-degree freedom driving device of the present embodiment also can be driven by a control system similar to that in FIG. 3 of Embodiment 1. Since the present embodiment uses a voice coil motor as driving means, a driving parameter output from a controlled amount calculating unit 303 may be a pulse width. In Embodiment 1, driving parameters for each vibration type motor include information on a frequency, a phase difference and a pulse width. Since the driving force of the voice coil motor of the present embodiment is controlled by current flowing through the driving coil, the pulse width is changed in accordance with a control signal by PWM (pulse width modulation) control. In this way, the control device of the present invention is applicable to such a multi-degree freedom driving device including a voice coil motor as driving means as well.

The present invention is not limited to the configuration described in the above embodiment, and is widely applicable to any multidirectional driving using a plurality of voice coil motors.

For instance, the present invention is applicable to the configuration of XYθ-direction driving using three voice coil motors shown in the conventional example and the configuration of XY-direction driving using two voice coil motors.

The present embodiment describes the example considering a difference in transfer characteristics among X, Y and θ directions, and the present invention is not limited to this. The present invention is applicable to the case of driving a moving body in two directions including a first direction and a second direction only, where the first direction and the second direction may cross each other but may not cross each other at right angles.

The control device of the present embodiment performs coordinated control while considering a difference in transfer characteristics of the driving force, which is obtained by synthesizing the driving forces of the vibration type motors, among the X, Y and θ directions, and so enables improvement of controllability for position deviation and responsivity and enables driving of the moving body multidirectionally.

Embodiment 3

Figure 15:
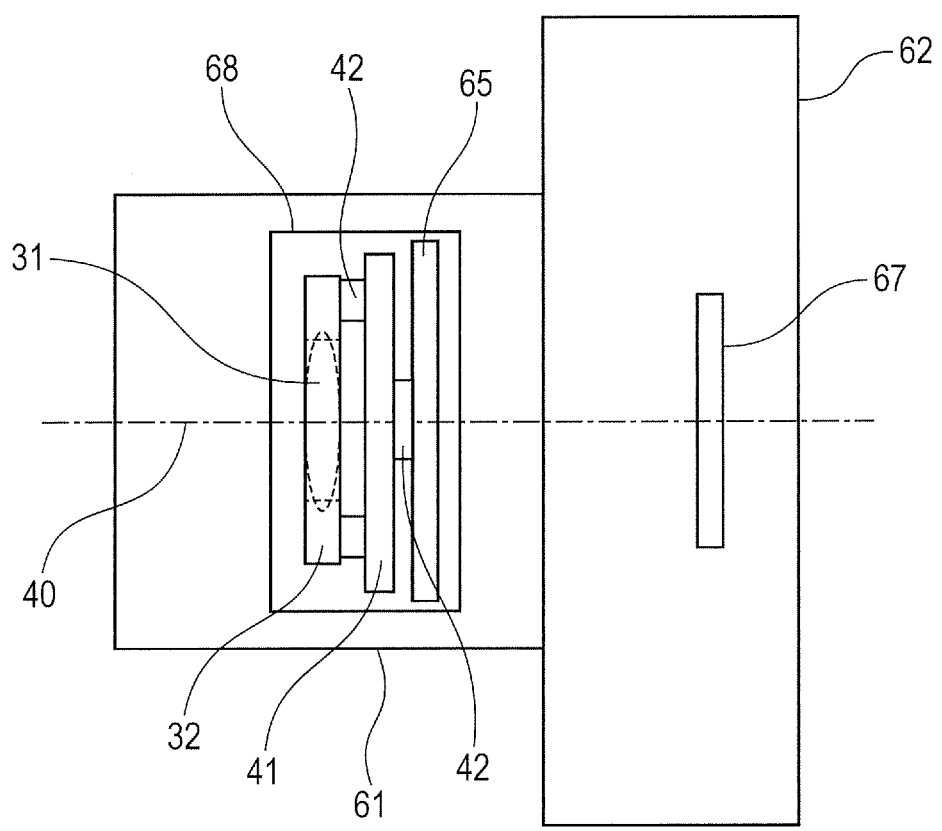
FIG. 15 describes an application example of a motor control device.

The following describes an example where the motor control device of the present invention is applied to an imaging device (optical apparatus) such as a camera. Referring to FIG. 15, the following describes an example where a vibration type motor to drive a lens for autofocusing is assembled in a lens barrel of the imaging device.

FIG. 15 is a cross-sectional view of a camera as an imaging device to correct image blur by a correction lens. The camera of FIG. 15 has an imaging function of motion pictures and stationary pictures. The camera includes a lens barrel 61 and a camera body 62. The camera further includes a correction optical device 68 built in the lens barrel 61. The correction optical device 68 of the present embodiment includes a correction lens 31 and a moving plate (movable member) 32 holding the correction lens 31, and the moving plate 32 performs translation motion in a plane orthogonal to an optical axis 40 of the correction optical device by a driving device 42 provided at a rotary ring 65 and a sliding plate 41.

Although not illustrated in FIG. 15, the lens barrel 61 includes an optical system other than the correction lens 31, an acceleration sensor to detect the shake of the lens barrel 61 and an encoder to detect two-dimensional movement of the moving plate 32. The lens barrel 61 further includes a power supply to supply electric energy to the driving device and a controller to operate the power source by processing a signal of the acceleration sensor and a signal of the encoder.

The camera body 62 includes an imaging element 67 therein. Light from an object passes through the optical system in the lens barrel 61 including the correction lens 31, and is incident on the imaging element 67 in the camera body 62. The correction optical device 68 moves the correction lens 31 in accordance, with a signal of the acceleration sensor, thus enabling correction of image blur.

The present embodiment describes the example of the imaging device including the correction optical device that corrects image blur by moving the lens by the vibration type motor, and the present Invention is not limited to this. For instance, the present embodiment is applicable also to an imaging device including a correction optical device configured to correct image blur by moving an imaging element by a motor such as a vibration type motor.

Figure 16:
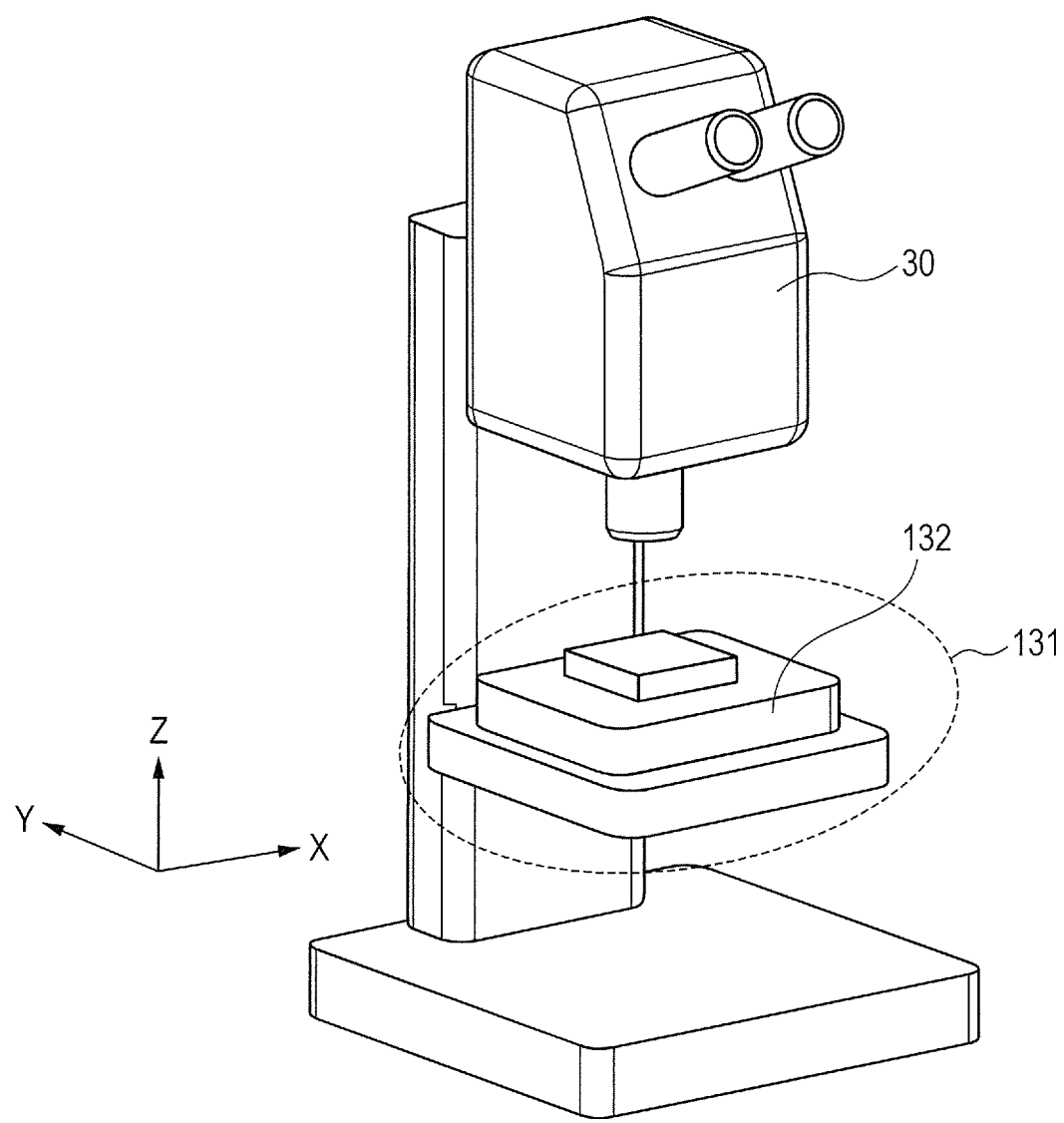
FIG. 16 describes an application example of a motor control device.

FIG. 15 describes the example where the vibration type driving device of the present invention is used in the imaging device. Application examples are not limited to this, and the vibration type driving device of the present invention can be used to drive various types of stages for microscope or the like. FIG. 16 describes an application example to drive a stage of a microscope.

FIG. 16 is a perspective view of a microscope including the motor control device of the present invention. The microscope of FIG. 16 includes an imaging unit 30 including an imaging element and an optical system built therein and an automatic stage 31 provided on a base and including a stage 32 that is moved by a vibration type driving device. An observation target is placed on the stage 32 and an enlarged image thereof is observed with the imaging unit 30. When an observed range is wide, the vibration type driving device moves the stage 32 so as to move the observation target in the X direction and the Y direction in the drawing, thus acquiring a large number of images. A computer not illustrated combines these images, whereby one high-definition image having a wide observation range can be acquired.

The present embodiment describes the example of using a vibration type motor as a motor in FIGS. 15 and 16, and the present embodiment is applicable also to the case of using other motors such as a voice coil motor.

According to one aspect of the present invention, a vibration type driving device enabling multidirectional driving by vector-synthesizing driving forces of a plurality of motors is configured. Such a device achieves coordinated control while considering a difference in transfer characteristics of the synthesized driving force of the plurality of motors between a first direction and a second direction crossing the first direction, whereby controllability of position deviation and responsivity can be improved. The present invention further can achieve an actuator, an image blur correction device, a replacement lens, an imaging device and an automatic stage capable of driving a moving body multidirectionally.

While the present invention has been described with reference to exemplary embodiments, it is to foe understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-198614, filed Sep. 10, 2012, and No. 2013-176525, filed Aug. 28, 2013 which are hereby incorporated by reference herein in their entirety.

What is claimed is:

1. A control device comprising:
a processor; and
a memory storing a program that, when executed by the processor, causes the processor to function as:
a deviation calculating unit configured to output a first deviation signal and a second deviation signal for a first direction and a second direction crossing the first direction, respectively, based on a difference between a position command and positional data on a moving body;
a compensation unit that outputs a first control signal and a second control signal based on the first deviation signal and the second deviation signal, respectively; and
a controlled amount calculating unit that outputs at least a first signal regarding a driving parameter for a first motor and a second signal regarding a driving parameter for a second motor, based on the first control signal and the second control signal,
wherein the compensation unit is configured to adjust control gain of the first deviation signal and the second deviation signal in accordance with a difference in transfer characteristics of a driving force that is obtained by synthesizing driving forces of the first motor and the second motor between the first direction and the second direction, thus outputting the first control signal and the second control signal, and
wherein the first motor and the second motor are controlled based on the first control signal and the second control signal.

2. The control device according to claim 1, wherein the controlled amount calculating unit is provided in a path of a control system that performs feedback control for the position command.

3. The control device according to claim 1, wherein the compensation unit is a calculating unit that compensates for phase delay or gain of positional data of the moving body with respect to the position command.

4. The control device according to claim 1, wherein the moving body is driven by a driving force obtained by synthesizing driving forces of the first motor and the second motor, at least one of the first motor and the second motor has a driving force generation axis in a direction crossing the first direction and the second direction, and the controlled amount calculating unit outputs the first signal and the second signal based on a calculation result using the first control signal and the second control signal.

5. The control device according to claim 1, wherein the first direction and the second direction are X direction and Y direction on XY coordinates that are two Cartesian coordinates in one plane, and
the moving body is configured to be movable in the first direction and the second direction.

6. The control device according to claim 1, wherein the controlled amount calculating unit is configured to:
calculate a controlled amount subjected to adjustment of the control gain in the first direction and the second direction, a coefficient that is determined by a relative angle of the driving force generation axis of the first motor with reference to a driving direction axis of the moving body, and a coefficient that is determined by a relative angle of the driving force generation axis of the second motor with reference to a driving direction axis of the moving body, and
output the driving parameter of each motor.

7. The control device according to claim 1, wherein the controlled amount calculating unit performs calculation based on a relative position of the first motor with reference to the moving body and a relative position of the second motor with reference to the moving body.

8. The control device according to claim 1, wherein the controlled amount calculating unit performs calculation using rotation matrix.

9. The control device according to claim 1, wherein the deviation calculating unit is configured to further output a third deviation signal for a third direction crossing the first direction and the second direction based on a difference between a position command and positional data on the moving body,
the compensation unit is configured to further output a third control signal based on the third deviation signal, and
the controlled amount calculating unit is configured to output a signal regarding a driving parameter for each of the first motor and the second motor based on the third control signal.

10. The control device according to claim 9, wherein the first direction and the second direction are X direction and Y direction on XY coordinates that are two Cartesian coordinates in one plane and the third direction is θ direction rotating about a central point of the XY coordinates, and
the moving body is configured to be movable in the first direction, the second direction and the third direction.

11. The control device according to claim 1, wherein the compensation unit includes a PID compensator capable of adjusting control gain in the first direction and the second direction, and
the control device further includes a driving circuit that generates a driving signal in accordance with the first signal and the second signal that is output from the controlled amount calculating unit.

12. An actuator, comprising:
the control device according to claim 1;
the first and second motors;
the moving body; and
a position sensor that detects a position of the moving body.

13. An image blur correction device, comprising:
the actuator according to claim 12; and
a lens,
wherein the lens is moved by the actuator.

14. A replacement lens, comprising:
a lens; and
the actuator according to claim 12,
wherein the lens is moved by the actuator.

15. An imaging device, comprising:
an imaging element;
a lens; and
the actuator according to claim 12,
wherein the imaging element or the lens is moved by the actuator.

16. The control device according to claim 1, wherein the first direction is X direction or Y direction on XY coordinates that are two Cartesian coordinates in one plane and the second direction is θ direction rotating about a central point of the XY coordinates, and
the moving body is configured to be movable in the first direction and the second direction.

17. A control device comprising:
a processor; and
a memory storing a program that, when executed by the processor, causes the processor to function as:
a deviation calculating unit that outputs a first deviation signal regarding a first direction and a second deviation signal regarding a second direction different from the first direction, based on a difference between a position command and positional data on a moving body;
a compensation unit that outputs a first control signal regarding the first direction based on the first deviation signal and outputs a second control signal regarding the second direction based on the second deviation signal; and
a controlled amount calculating unit that calculates a controlled amount of a first motor and a controlled amount of a second motor based on the first and second control signals,
wherein the first motor is configured to generate a driving force along a first driving direction different from the first and second directions,
wherein the second motor is configured to generate a driving force along a second driving direction different from the first direction, the second direction and the first driving direction,
wherein the controlled amount calculating unit calculates the controlled amount of the first motor by using both of the first and second control signals, and
wherein the first motor and the second motor are controlled based on the first control signal and the second control signal.

18. The control device according to claim 17,
wherein the deviation calculating unit outputs first to N-th deviation signals regarding first to N-th directions respectively, the first to N-th directions being different from each other,
wherein the compensation unit outputs first to N-th control signals regarding the first to N-th directions based on the first to N-th deviation signals, respectively,
wherein the controlled amount calculating unit calculates a controlled amount of each of first to M-th motors based on the first to N-th control signals, and
wherein each of N and M is an integer larger than 1, and N is less than M.

19. The control device according to claim 17,
wherein the deviation calculating unit outputs a third deviation signal regarding a third direction different from the first and second directions, based on a difference between a position command and positional data on a moving body, wherein the compensation unit outputs a third control signal regarding the third direction based on the third deviation signal, and wherein the controlled amount calculating unit calculates the controlled amount of the first motor regarding the first driving direction different from the third direction by using the first, second and third control signals.

20. The control device according to claim 19, wherein the first direction is X direction on XY coordinates that are two Cartesian coordinates in one plane, wherein the second direction is Y direction on the XY coordinates, and wherein the third direction is θ direction rotating about a central point of the XY coordinates.

21. The control device according to claim 17, wherein the compensation unit acquires the first control signal regarding the first direction using a control gain, and acquires the second control signal regarding the second direction using another control gain.

22. The control device according to claim 21, wherein the first direction is X direction or Y direction on XY coordinates that are two Cartesian coordinates in one plane, and wherein the second direction is θ direction rotating about a central point of the XY coordinates.

23. The control device according to claim 22, wherein the another control gain regarding the second direction is smaller than the control gain regarding the first direction.

24. The control device according to claim 17, wherein the first and second directions are any two of X direction and Y direction on XY coordinates that are two Cartesian coordinates in one plane and θ direction rotating about a central point of the XY coordinates.

25. The control device according to claim 24, wherein the first motor is configured to generate a driving force along the first driving direction which is in the one plane and intersects with the X and Y directions, wherein the second motor is configured to generate a driving force along a second driving direction which is in the one plane and intersects with the X and Y directions, and wherein the first driving direction is different from the second driving direction.

26. The control device according to claim 17, wherein each of the first and second motors is a vibration type motor or a voice coil motor.

27. An actuator, comprising:
the control device according to claim 17;
the first and second motors;
the moving body; and
a position sensor that detects a position of the moving body.

28. An image blur correction device, comprising:
the actuator according to claim 27; and
a lens,
wherein the lens is moved by the actuator.

29. A replacement lens, comprising:
a lens; and
the actuator according to claim 27,
wherein the lens is moved by the actuator.

30. An imaging device, comprising:
an imaging element;
a lens; and
the actuator according to claim 27,
wherein the imaging element or the lens is moved by the actuator.

31. An automatic stage, comprising:
a stage; and
the actuator according to claim 27,
the actuator driving the stage by driving the moving body.

32. The control device according to claim 17, wherein the controlled amount calculating unit calculates the controlled amount of the second motor by using both of the first and second control signals.

33. A control method comprising:
a deviation calculating step of outputting a first deviation signal regarding a first direction and a second deviation signal regarding a second direction different from the first direction, based on a difference between a position command and positional data on a moving body;
a compensating step of outputting a first control signal regarding the first direction based on the first deviation signal and outputting a second control signal regarding the second direction based on the second deviation signal; and
a controlled amount calculating step of calculating a controlled amount of a first motor and calculating a controlled amount of a second motor based on the first and second control signals,
wherein the first motor is configured to generate a driving force along a first driving direction different from the first and second directions,
wherein the second motor is configured to generate a driving force along a second driving direction different from the first direction, the second direction and the first driving direction,
wherein the controlled amount calculating step includes a step of calculating the controlled amount of the first motor by using both of the first and second control signals, and
controlling the first motor and the second motor based on the first control signal and the second control signal.

34. A control device comprising:
a deviation calculator that outputs a first deviation signal regarding a first direction and a second deviation signal regarding a second direction different from the first direction, based on a difference between a position command and positional data on a moving body;
a compensator that outputs a first control signal regarding the first direction based on the first deviation signal and outputs a second control signal regarding the second direction based on the second deviation signal; and
a controlled amount calculator that calculates a controlled amount of a first motor and a controlled amount of a second motor based on the first and second control signals,
wherein the first motor is configured to generate a driving force along a first driving direction different from the first and second directions,
wherein the second motor is configured to generate a driving force along a second driving direction different from the first direction, the second direction and the first driving direction,
wherein the controlled amount calculator calculates the controlled amount of the first motor by using both of the first and second control signals, and
wherein the first motor and the second motor are controlled based on the first control signal and the second control signal.

* * * * *